(No Model.)  2 Sheets—Sheet 1.

G. HAYES.
BICYCLE WHEEL.

No. 588,332. Patented Aug. 17, 1897.

Witnesses:
Arthur Hayes.
Harry J. Black.

Inventor:
Geo. Hayes.

(No Model.) 2 Sheets—Sheet 2.

G. HAYES.
BICYCLE WHEEL.

No. 588,332. Patented Aug. 17, 1897.

Witnesses
Arthur Hayes
Harry S. Black

Inventor
Geo Hayes

UNITED STATES PATENT OFFICE.

GEORGE HAYES, OF NEW YORK, N. Y.

BICYCLE-WHEEL.

SPECIFICATION forming part of Letters Patent No. 588,332, dated August 17, 1897.

Application filed October 23, 1896. Serial No. 609,842. (No model.)

*To all whom it may concern:*

Be it known that I, GEORGE HAYES, a citizen of the United States, and a resident of the city, county, and State of New York, have invented a new and useful Improvement in Wheels for Bicycles and other Vehicles, of which the following is a specification.

My improvement relates to that class of wheels in which resiliency is derived from mechanism located between the hub and rim, wholly within the wheel, whereby pneumatic tires used heretofore outside the rim may be dispensed with; and my invention consists of a construction of wheel with rim, rigid wire tensional spokes, and a hollow cylindrical nave, to the latter of which the inner ends of the spokes are connected or secured, and within the center of the hollow of the spoke-nave locating the hub through which the axle of the vehicle passes, supporting and connecting the spoke-nave with the axle-hub by a series of peculiarly formed and arranged metal arc-springs, as spring wires or rods, by which the distance between the spoke-nave and axle-hub will be maintained with resiliency allowed for, equilibrium secured, and communication of shock to the rider prevented, all as hereinafter more fully and definitely described, and pointed out in the claims, reference being had to the accompanying drawings, in which—

Figure 1:
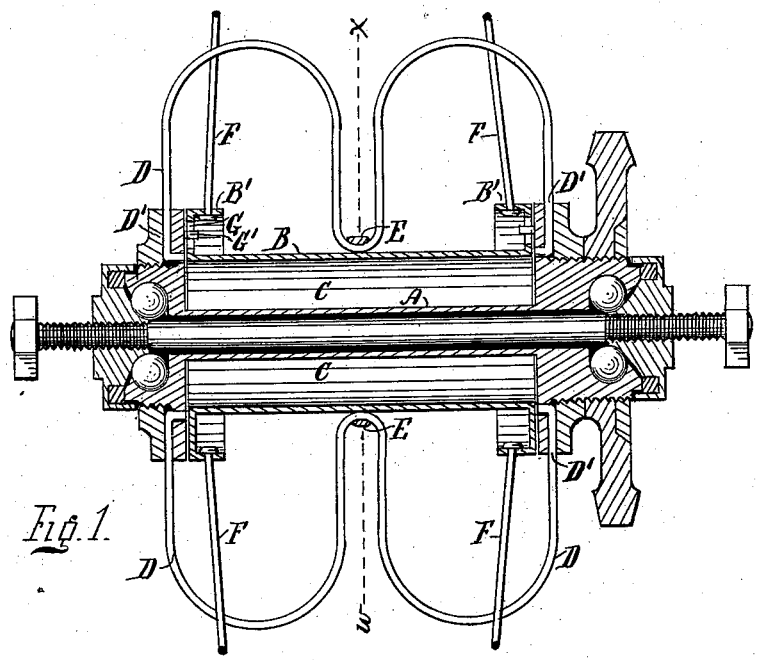
Figure 2:
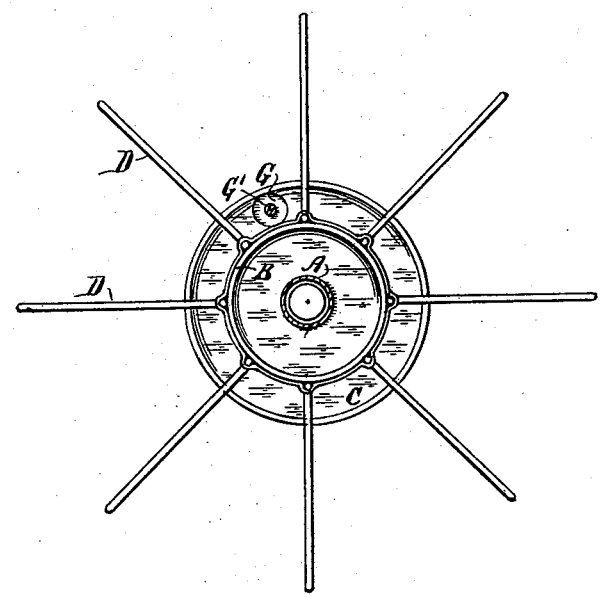
Figure 9:
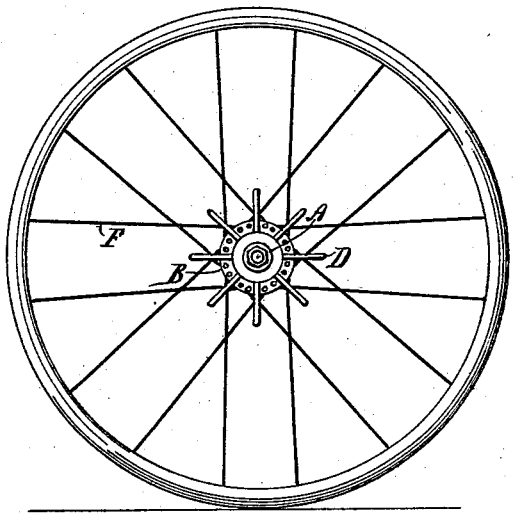

Figure 1 represents a longitudinal section of the hub portion of the wheel, with spoke-nave, resilient mechanism, and connection. Fig. 2 is a cross-section of the hub portions of the wheel and connecting parts on line $w\ x$ of Fig. 1. Figs. 3, 4, 5, 6, 7, and 8 are views analogous to Fig. 1, representing various modifications in respect to forms of resilient springs and their connection with spoke-nave and axle-hub as equivalent to that of Fig. 1. Fig. 9 is a side or face elevation of the wheel entire.

On the drawings, A indicates the main hub, which engages the axle and which I designate as the "axle-hub." It is formed with ball-bearings, substantially as usual.

B indicates the supplemental nave, which I designate the "spoke-nave." This is simply a cylinder encircling the main hub A within the enlarged ball-bearing heads and so arranged that a space C is provided between the axle-hub and its inclosure, the spoke-nave.

D indicates the resilient springs of metal wire or rod secured to the axle-hub A, as shown at D', between flanges or flange-rings, threaded upon or otherwise fastened to the hub A, reaching outwardly therefrom in a radiating direction, arching or otherwise extending over and backwardly to the exterior surface of the spoke-nave B, which they are secured to after the manner shown at E.

Figure 7:
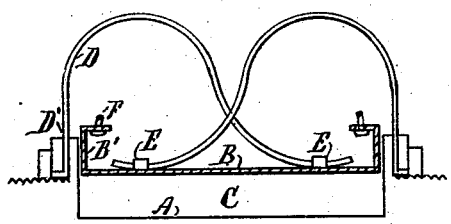
Figure 8:
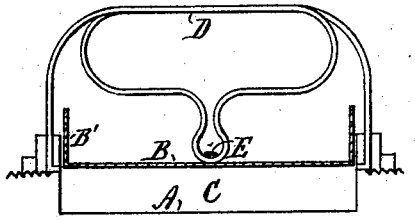

The springs D may be in one piece each, with each end connected to the axle-hub at opposite ends thereof, as shown in Fig. 1, or they may be formed in two, as shown in Fig. 7, their principle of action being the same in either case. These springs D are shown as a series of eight, but there may be more or less in number, and they constitute the means whereby the spoke-nave is suspended at a suitable distance from the main hub A all around, and the spoke-nave B is formed with flanges B', to which the rigid spokes of the wheel are connected. These are shown at F. They form the connection between nave B and rim. Thus the wheel is formed upon the suspension principle, the nave B being held rigidly in position by the tensile strength of the spoke-wires, which are tangentially arranged with regard thereto alternately from side to side of the wheel, as usual, while the axle-hub A rests normally in central position within, their relation between being resiliently sustained by the springs D, the vibrations of which under pressure or shock is mostly in the portion of each which radiates directly from the hub A inwardly and outwardly as the wheel revolves. The rim of the wheel thus gets nearer to or farther from the hub A, as circumstances may necessitate, but always remains equidistant from the hub A, which remains in the center when the wheel is at rest. This movement of the rim, rigid spokes, and spoke-nave does not affect the position of the axle-hub A, when inclosing the axle of a bicycle under the torsional strain of the sprocket-chain, as the hub A is not moved out of location, being held by the bicycle-frame, and the distance between it and the crank-axle of the vehicle is always the same.

Figure 3:
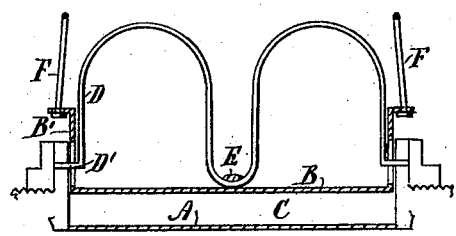
Figure 4:
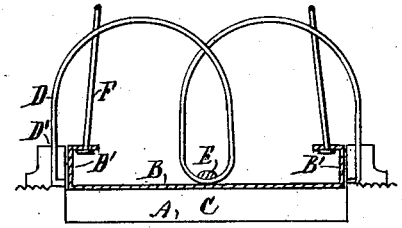
Figure 5:
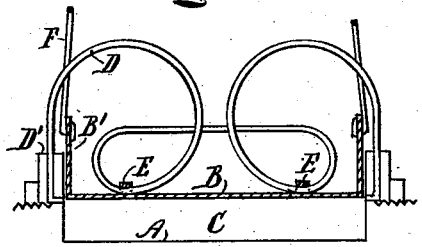
Figure 6:
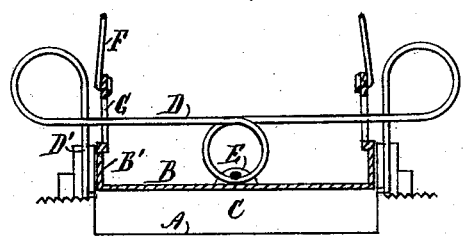

To render certain the conjoint revolution of the axle-hub A and the spoke-nave B, also spokes F and rim of the wheel, I provide a suitable opening in the cheek-flanges B' of spoke-nave B, as at G, Figs. 1 and 3, where a pin G' or analogous device serves to prevent displacement, while allowing for the resilient action of the springs D. The springs D have a transverse strain upon them, also a torsional strain in the direction of their length throughout the arc to its connection with spoke-nave B.

This invention is susceptible of several modifications as to the form of springs and their connections, as shown in the several figures of the drawings, all of which involve the same principle of action and are consequently equivalents.

What I claim as new, and desire to secure by Letters Patent, is—

1. A wheel for bicycles and other vehicles, having a central axle-hub within the hollow of a spoke-nave, the two connected resiliently by a set of externally-arranged arc-springs, having their ends secured to the axle-hub and extending parallel to the longitudinal axis of the hub, secured at a point midway of their length to the external peripheral face of the spoke-nave, essentially as set forth.

2. In a wheel for bicycles and other vehicles, an axle-hub suspended within a hollow spoke-nave by a system of arc-shaped suspensory-springs, externally arranged and extending parallel to the longitudinal axis of the hub with ends secured between annular plates secured upon the hub, and midway between the springs secured to the spoke-nave, essentially as set forth.

3. A wheel for bicycles and other vehicles, comprising a rim, tension-spokes tangentially secured to a hollow cylindrical nave, and within said nave an axle-hub connected therewith by a system of externally-located arc-springs, which arching and extending longitudinally parallel to the longitudinal axis of the hub, and secured to both, provide for resilient action, essentially as set forth.

GEO. HAYES.

Witnesses:
ARTHUR HAYES,
HARRY I. BLACK.